United States Patent Office 3,572,368
Patented Mar. 23, 1971

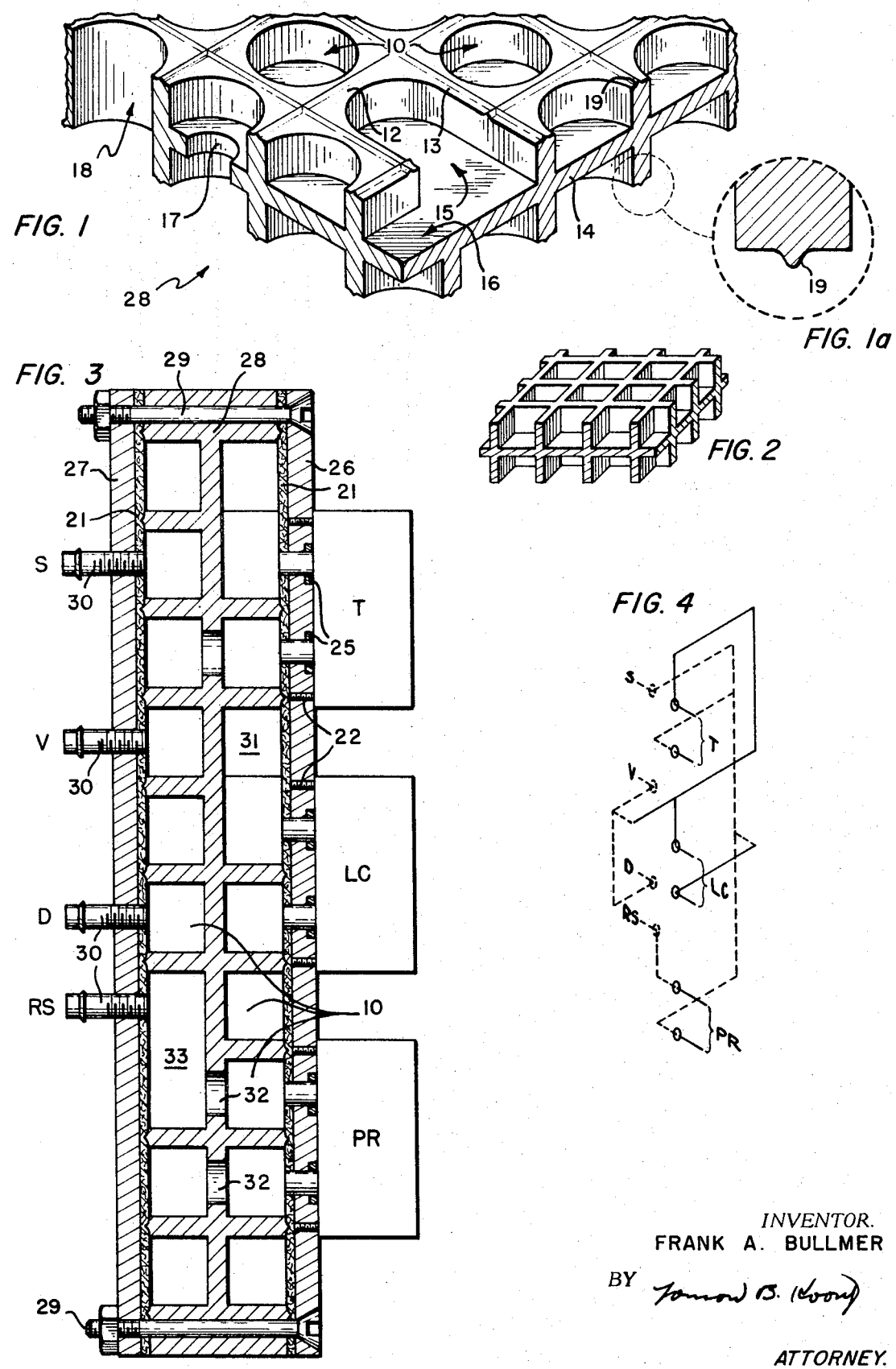

3,572,368
PNEUMATIC CONTROL SYSTEM MANIFOLD MEANS
Frank A. Bullmer, Des Plaines, Ill., assignor to Honeywell Inc., Minneapolis, Minn.
Filed Sept. 2, 1969, Ser. No. 854,389
Int. Cl. F15c 1/06
U.S. Cl. 137—269            8 Claims

ABSTRACT OF THE DISCLOSURE

A pneumatic control system manifold assembly for the mounting and interconnecting of pneumatic control devices comprising a waffle-like grid, gaskets, a top plate, a bottom plate and connectors. The grid has on either face a full pattern of hollow cells separated by thin walls which may be removed to provide passageways for both lateral and vertical fluid flow. The cells on either side of the grid are sealed by gaskets which are disposed between the grid and the top and bottom plates thus providing a simple, inexpensive and highly flexible means for the mounting and interconnection of pneumatic control devices eliminating the need for external tubing connections between the devices.

---

This invention relates to a pneumatic control system manifold device which provides a means for the mounting and interconnecting of pneumatic control devices without the use of tubing or piping except that which delivers fluid to the manifold and carries fluid away from the manifold, all interconnections being made within the manifold through the use of a formed or molded waffle-like grid.

In its simplest form, this invention comprises a grid and a cover plate. The grid comprises a web having on one face a plurality of hollow pockets in a waffle-like pattern, these pockets being defined by intersecting thin-walled partitions which may be removed to provide passageways for fluid flow. The grid and the cover plate are fastened together, the cover plate acting as a sealing means of the hollow pockets. With appropriate passageways formed in the grid for fluid flow, control devices are attached to the cover plate, there being holes formed in the cover plate which register with the appropriate passageways. Connectors which also register with suitable passageways are secured to the back of the grid or to one edge thereof or are formed in the edge of the grid or attached to the cover plate. These connectors are used for the communication of fluid from fluid sources or to desired external devices. This entire assembly may then be mounted to a wall or a panel or the like, all external connections between the control devices mounted on the cover plate having been obviated by the passageways in the grid.

The preferred embodiment of this invention comprises a grid, a top plate and a bottom plate. This grid is comprised of a web having on both faces a plurality of hollow pockets in a waffle-like pattern, these pockets being defined, as above, by intersecting thin-walled partitions which may be removed to provide passageways for fluid flow. This grid is interposed between the top and bottom plates, these three elements being assembled in a sealed and stacked relation and fastened together or secured by bolts, rivets or other suitable means. Again, control devices are mounted on the top plate, and connectors may be a part of or attached to the top plate or the bottom plate or any side of this assembly.

The above-described grids are preferably made of a substantially rigid material such as metal, plastic or the like. The waffle-like pattern of hollow pockets on either face of the grid is preferably molded, although it may be cast or otherwise formed. The passageways on the face or faces of the grid may be initially molded along with the waffle-like pattern of hollow pockets or the passageways may be later formed by removing the thin-walled partitions defining the hollow pockets. Similarly, when communication between either side of the web is desired, holes may be initially formed or molded in the web so that hollow pockets on either side of the web are made to communicate, or holes may be later punched or drilled or otherwise formed in the web to provide said communication.

The preferred embodiment of this manifold assembly also has a sealing means interposed between the grid and both the top and bottom plates in the form of a gasket-like material. This gasket-like material as a sealing means is complemented by a raised bead along the edge of each of the partitions defining the hollow pockets and passageways. This bead and the gasket co-act to form a fluid-tight seal between the grid and the top and the bottom plates. Obviously, neither the raised bead nor the sealing means in the form of a gasket is essential to this invention. Alternative forms of sealing the hollow pockets and passageways may be incorporated as desired.

The grid in this manifold assembly may be used in a multilayered manifold assembly wherein two or more grids sharing common gaskets or sealing means are interposed between one top and one bottom plate. This multilayered manifold assembly gives the capability of a more complex network or series of interconnections between a greater number of control devices.

Thus, this invention consists in the construction, arrangement and combination of the various parts of the manifold assembly as hereinafter more fully set forth, pointed out in the claims and illustrated in detail on the accompanying drawings, wherein:

FIG. 1 is a perspective view of a portion of the waffle member of the manifold assembly;

FIG. 1a is an enlarged detail view of the seal promoting bead;

FIG. 2 is an alternative embodiment of the waffle member of the manifold assembly;

FIG. 3 is a cross-section of the manifold assembly showing three attached pneumatic control devices; wherein "T" denotes a thermostat, "LC" denotes a limit control, "PR" denotes a pressure regulator, "S" denotes a supply connector, "V" denotes a valve connector, "D" denotes a damper connector and "RS" denotes a regulated supply connector, and;

FIG. 4 is a three-dimensional schematic of the circuitry incorporated in the manifold assembly illustrated in FIG. 3.

FIG. 1 shows a portion of the grid or waffle member of the pneumatic control system manifold assembly. A preferred embodiment of the grid comprises a web 14 having on either side thereof a plurality of circular pockets 10 formed in a patterned and spaced relation, separated by thin-walled partitions 12, 13, which may be removed by a suitable means to form passageways between the pockets. Passageways 15 and 16 may also be initially formed or molded on either side of the grid. Similarly, communication between either side of the web 14 may be effected by drilling a hole 17 in or otherwise removing a portion of the web or by initially forming a passageway 18 between either side. The pluralities of pockets on each face preferably register or coincide in order to facilitate the drillng of hole or holes 17.

A bead 19, shown in FIG. 1a, is formed along the edge of each partition. The presence of the bead reduces the effective surface area of the grid which comes into contact with the necessary sealing means or gasket-like material 21 and thereby reduces the force required to seal the manifold assembly.

FIG. 3 discloses a cross-sectional view of a manifold assembly with three control devices, T, LC and PR, indicated schematically as being attached by a suitable means 22 and communicating with one or more of the pockets 10 in a sealed relation. Seals for the connector ports of the above devices may be provided by O-rings 25.

The manifold assembly comprises a grid 28 disposed between two layers of gasket-like material 21, which are in turn preferably disposed between a top plate 26 and a bottom plate 27. Bolts 29 or similar means are employed to fasten the grid, gaskets and top and bottom plates together and also to provide the necessary force to seal the pockets. Obviously, sealing means other than gaskets may be used, such as suitable coatings or the edges of the waffle member or the intersurfaces of the plates. Passageways 31, 33 are formed in the grid to provide communication between adjacent pockets. Holes 32 are also formed in the web to provide communication between pockets on opposite sides of the web. A plurality of connectors 30 are provided for external communications such as to an air supply, a valve, a damper and a regulated supply. The waffle member or grid may be molded with suitable passageways where volume justifies this procedure or the partitions or walls between the pockets may be removed by machining or suitable manual means. Likewise the holes needed through the web portion of the waffle member may be molded in place or can be drilled or punched as found desirable.

FIG. 4 is a three-dimensional, schematic representation of the connections or passageways employed in FIG. 3 and provides an example of how the present manifold construction may be used. Connections to the thermostat, the limit control and the pressure regulator are shown as well as the connectors which lead to the supply, the valve, the damper and the regulated supply.

The embodiments of the invention in which an exclusive property or right is claimed are defined as follows:

1. A pneumatic control system manifold component comprising:
   a thin web;
   a plurality of intersecting thin walled partitions on each face of said web defining registering pluralities of hollow pockets in waffle-like patterns;
   said web and said partitions being made of a relatively rigid and machineable material;
   portions of said partitions being selectively removable to allow two or more of said pockets to form at least one passageway;
   said component being adapted for use in a manifold assembly wherein some of said hollow pockets and connecting passageways are covered by a suitable covering means.

2. A pneumatic control system manifold component according to claim 1 wherein a portion of at least one of said partitions on at least one face of said web has been removed to allow two or more pockets to form at least one passageway on at least one face of said web.

3. A pneumatic control system manifold component according to claim 2 in combination with covering means, said covering means having at least one hole therein registering with a passageway in said manifold component, and fastening means for securing said manifold component and said covering means together in a sealed relation.

4. A pneumatic control system manifold component according to claim 1 wherein a plurality of said partitions have been removed to allow a plurality of said hollow pockets to form passageways and at least one hole has been formed in said web registering with a passageway, in combination with covering means comprising two substantially rigid plates having a plurality of holes therein registering with at least two of said passageways in said manifold component, and fastening means for securing said manifold component and covering means together in a stacked and sealed relation.

5. A manifold assembly as defined in claim 3 in combination with sealing means interposed between said manifold component and said covering means.

6. A manifold assembly as defined in claim 4 in combination with sealing means interposed between said manifold component and said covering means.

7. A manifold assembly as defined in claim 6 wherein said sealing means comprises a gasket-like material interposed between said manifold components and said covering means and a raised bead disposed along the edge of each of said partitions, said gasket-like material and said raised bead co-acting to seal said hollow pockets and passageways.

8. A manifold assembly as defined in claim 7 in combination with a plurality of control devices, including at least one condition control device, secured to at least one of said substantially rigid plates and communicating with selected passageways.

References Cited

UNITED STATES PATENTS

| | | | |
|---|---|---|---|
| 3,195,572 | 7/1965 | Carls | 137—608X |
| 3,213,883 | 10/1965 | Carls | 137—608 |
| 3,495,604 | 2/1970 | Trask | 137—608X |

M. CARY NELSON, Primary Examiner

R. J. MILLER, Assistant Examiner

U.S. Cl. X.R.

137—608